H. G. HANSON.
HARROW.
APPLICATION FILED OCT. 17, 1914. RENEWED JUNE 21, 1916.
1,210,795.
Patented Jan. 2, 1917.
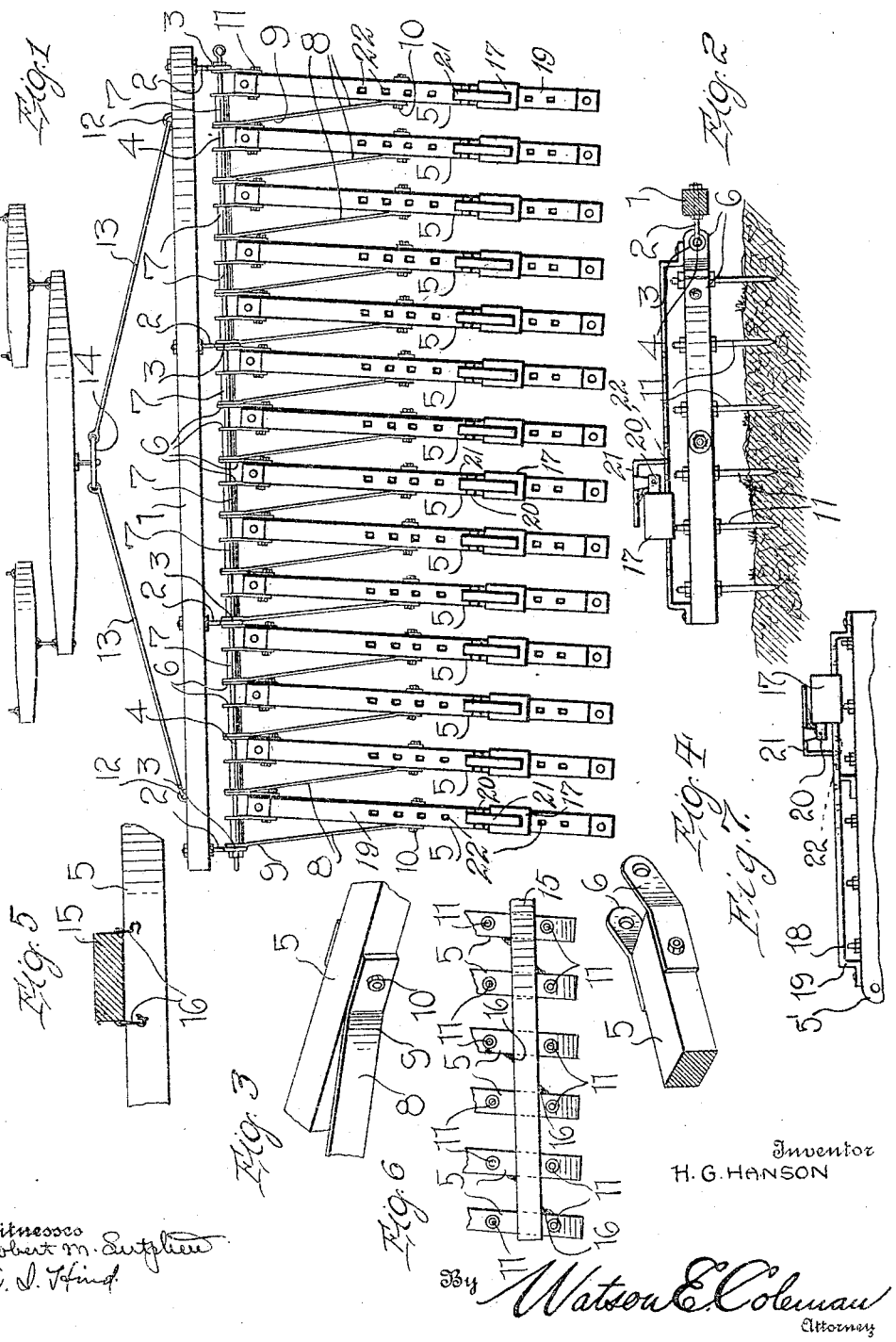
Inventor
H. G. HANSON
Witnesses
Robert M. Sutphen
A. J. Hind
By Watson E. Coleman
Attorney

UNITED STATES PATENT OFFICE.

HANS G. HANSON, OF GETTYSBURG, SOUTH DAKOTA.

HARROW.

1,210,795.  Specification of Letters Patent.  Patented Jan. 2, 1917.

Application filed October 17, 1914, Serial No. 867,191.  Renewed June 21, 1916.  Serial No. 105,085.

*To all whom it may concern:*

Be it known that I, HANS G. HANSON, a citizen of the United States, residing at Gettysburg, in the county of Potter and State of South Dakota, have invented certain new and useful Improvements in Harrows, of which the following is a specification, reference being had to the accompanying drawings.

This invention relates to new and useful improvements in drags or harrows and more particularly to that type known as rigid toothed harrows.

The main object of the invention is the provision of a harrow wherein the drag bars are all disposed in parallel relation and arranged obliquely with respect to the draft bar, said drag bars being pivotally mounted at one end and provided with means whereby they are yieldably retained in their effective positions.

A further object of the invention is the provision of a drag or harrow of the above character which will possess advantages in points of efficiency and durability, is inexpensive to manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a top plan view of the harrow constructed in accordance with my invention; Fig. 2 is a longitudinal sectional view through the same; Fig. 3 is a detail perspective view illustrating the manner of securing the brace members; Fig. 4 is a detail perspective view of the inner end of one of the drag bars; Fig. 5 is a side elevation of one of the drag bars illustrating the removable bar in cross section; Fig. 6 is a top plan view illustrating the relative position of the removable bar with respect to the drag bars; Fig. 7 is a side elevation of one of the drag bars, illustrating a movable weight applied thereto.

Referring more particularly to the drawings, 1 indicates the draft bar of my improved harrow having extended transversely therethrough and arranged in spaced relation the bolts 2 which are provided at one end with suitable eyes 3 in which the pivoted rod 4 is mounted. The drag bars which are generally indicated by the numeral 5 are arranged in spaced parallel relation and the entire number of bars are disposed obliquely with respect to the draft bar 1 and secured to the forward ends of the drag bars are the spaced plates 6, the ends of which project beyond the ends of the drag bars and are pivotally mounted upon the rod 4. It will be noted from the accompanying drawings that the spaced projecting ends of the plates 6 are disposed slightly at an angle with respect to the ends which are secured to the drag bars so that the bars will be disposed obliquely with respect to the connecting rod 4.

Arranged between the inner ends of each two of the drag bars 6 and mounted upon the rod 4 are the sleeves 7 which retain the inner ends of the bars in spaced relation and pivotally mounted upon the rod 4 is the inner end of the resilient brace member 8, the outer end of which is disposed at an angle, as shown at 9, and bolted or otherwise secured to the medial portion of the drag bar, as shown at 10. The brace bars which are connected at their outer ends to the drag bars preferably have their inner ends mounted upon the rod 4 adjacent the inner end of the drag bar next in order, so that the drag bar thus braced is yieldably held in position and should the same strike a stone or other object, the brace 8 will yield to allow the drag bar to pass around the stone instead of being pulled over the same, thus eliminating the accidental bending or breaking of the teeth.

The drag bars 5 are each provided with a plurality of teeth generally indicated by the numeral 11 and which are arranged in spaced parallel relation throughout the entire length of the drag bars. These teeth, as illustrated in the accompanying drawings, are preferably of the rigid type, but it will be understood that spring teeth may be used in place of the rigid teeth if so desired. It will be noted that by the use of the yieldable members 8, the drag bars 5 will not only be retained in their effective positions, but will be allowed to move laterally with respect to the draft bar should the teeth 11 strike an object in the path of the harrow and thus permit the drag bar to pass to one side of the object instead of passing over the same and breaking or bending the teeth. Spaced loops 12 are secured to the forward side of the draft bar 1 and loosely connected thereto are the rods 13, the outer ends of which are connected to a ring 14 to which the whiffletree is connected whereby draft animals may be readily connected to or disconnected from the harrow. It will be noted that by the arrangement of the brace members, the drag bars are only permitted to yieldably swing in one direction, but it is thought that this movement is sufficient to permit the same to pass around any objects in the path of the harrow.

In using my harrow for gathering weeds and loose brush upon plowed ground, I prefer to retain the bars 5 in a rigid position by removably connecting thereto a transverse bar 15 which is arranged between the two outer sets of teeth and is removably secured to the bars by means of the hook members 16. These hook members 16 are to be arranged alternately between the sets of bars so that any longitudinal movement on the part of the bar 15 will not disengage the hooks from the bars 5. While I have shown the bar 15 removably secured to the drag bars 5 by means of the hooks 16, it will be understood that bolts or other suitable forms of removable fastening means may be used if desired.

In Fig. 7 I have illustrated a slightly modified form of the invention, wherein a movable weight is applied to the upper face of the drag bar 5' and is adjustably mounted thereon, so that the weight may be either arranged at the forward end of the drag bar or at the rear end thereof, according to the depth at which the earth is to be worked. When the weight, which is generally indicated by the numeral 17, is moved forwardly upon the drag bar, the entire teeth of the harrow will engage deeply within the earth but, on the other hand, if the weight is moved rearwardly, only the rear teeth thereof will be forced deeply into the earth. This weight 17 is adjustably mounted upon a bar 18 supported in spaced relation from the drag bar 5' by means of the supporting feet 19. Formed upon the forward end of the weight 17, are the spaced ears 20 and pivotally mounted between said ears is a spring actuated catch 21, the downwardly projecting end of which is adapted to engage within the openings 22 formed in the bar 18, whereby the weight may be quickly and readily adjusted thereon and retained in its adjusted position.

From the above description taken in connection with the accompanying drawings, it will be readily apparent that I have provided a simple and durable harrow or drag of the rigid tooth type wherein the drag bars are arranged in parallel relation and the entire set of drag bars disposed obliquely with respect to the draft bar. Furthermore, these drag bars are pivotally connected to the draft bar and are provided with means whereby they are yieldably retained in their effective positions so that should the teeth on the same strike a rigid object in the path of the harrow, the drag bars will be permitted to pass to one side of the object instead of passing thereover. It will also be apparent that my improved harrow or drag is extremely simple in construction and can be manufactured at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the appended claims.

What I claim is:—

1. A device of the class described including a draft bar, spaced bearings carried thereby, a rod arranged in spaced parallel relation with the draft bar and mounted in said bearings, drag bars having spaced plates secured to the inner ends thereof, said plates projecting beyond the ends of the drag bars at an angle and pivotally mounted upon said rod, teeth carried by the drag bars, sleeves arranged between the inner ends of the drag bars to retain the same in spaced relation, yieldable brace members having their inner ends mounted upon said rods and their outer ends rigidly connected to the medial portions of the draft bars, said brace members having their inner ends disposed adjacent the drag bar next in order, as and for the purpose set forth.

2. A device of the class described including a draft bar, spaced bearings carried thereby, a rod arranged in parallel relation to the draft bar and mounted within said bearings, drag bars arranged in spaced relation and pivotally mounted upon said rod, teeth carried by said drag bars, and a movable member supported upon said drag bars, whereby the adjustment of said member will vary the depth or of engagement of the teeth with the earth.

In testimony whereof I hereunto affix my signature in the presence of two witnesses.

HANS G. HANSON.

Witnesses:
H. C. DILLON,
A. M. CLARK.